United States Patent [15] 3,635,087
Conklin [45] Jan. 18, 1972

[54] APPARATUS FOR RECORDING A TEMPERATURE PROFILE

[72] Inventor: Charles E. Conklin, Pleasant Valley, N.Y.
[73] Assignee: Conklin Instrument Corp., Pleasant Valley, N.Y.
[22] Filed: Dec. 29, 1969
[21] Appl. No.: 888,640

[52] U.S. Cl. .................................................. 73/343.5
[51] Int. Cl. .................................................... G01k 3/06
[58] Field of Search .............. 73/343, 343.5, 361; 346/139 C; 248/123

[56] References Cited

UNITED STATES PATENTS

| 314,771 | 3/1885 | Abbott | 248/123 X |
| 833,167 | 10/1906 | Hughes | 248/123 |
| 2,986,890 | 6/1961 | Bevans | 73/361 X |
| 3,090,233 | 5/1963 | Shields | 73/343 |
| 3,152,479 | 10/1964 | Small | 73/344 X |
| 3,187,332 | 6/1965 | Barter | 346/139 |
| 3,269,681 | 8/1966 | Azim | 248/123 |

Primary Examiner—Louis R. Prince
Assistant Examiner—Denis E. Corr
Attorney—Sughrue, Rothwell, Mion, Zinn & Macpeak

[57] ABSTRACT

A highly accurate temperature-profiling package assembly includes a strip chart recorder and refrigerated ice water reference junction connected to a movable thermocouple junction which is reversibly motor driven through a disengageable screw and nut transmission, and position indicating buttons which control a switch for actuating a marking relay in the recorder which has a floating marking pen.

10 Claims, 12 Drawing Figures

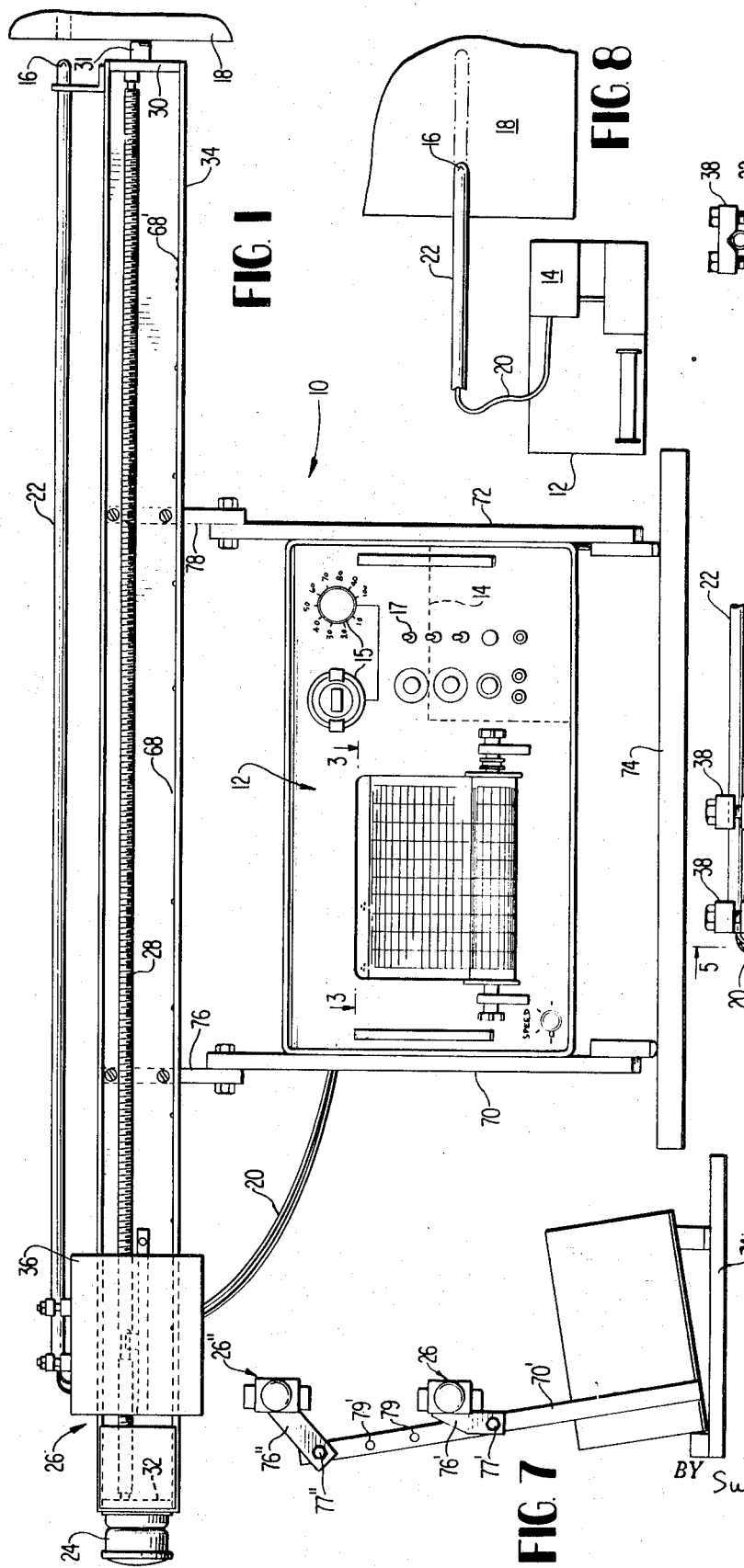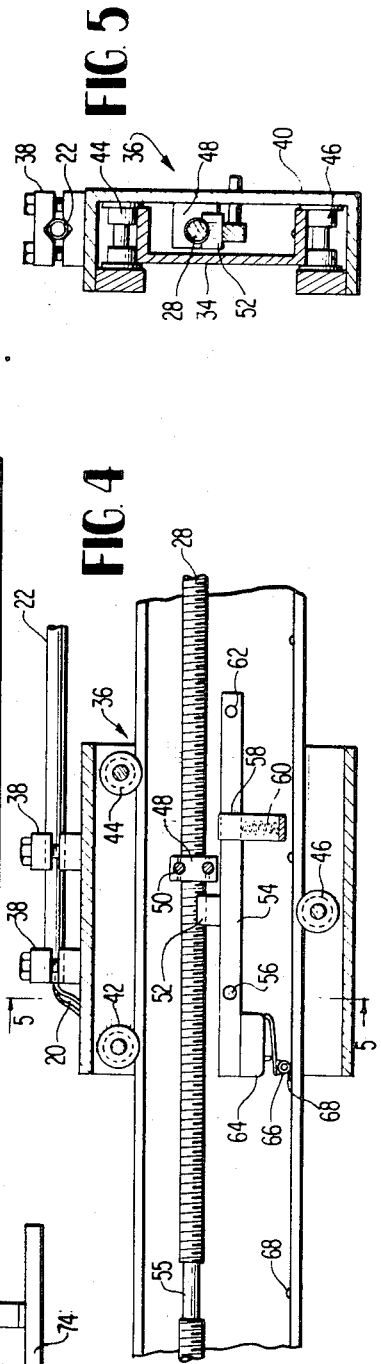

APPARATUS FOR RECORDING A TEMPERATURE PROFILE

BACKGROUND OF THE INVENTION

1. Field of the Invention

This invention relates to improvements in apparatus for recording a highly accurate temperature profile along a given dimension within a heated enclosure such as a diffusion furnace.

2. Description of the Prior Art

There is a tremendous demand for electronic microcircuits and in the process of manufacturing microcircuitry, it is necessary for the manufacturer to employ diffusion furnaces. These furnaces are high-temperature enclosures operating under highly controlled conditions and environments permitting diffusion to take place as required in the creation of the circuitry. One of the requirements is that the manufacturer must maintain records of the highly elevated temperature (1,000° C. or more) within the diffusion furnace. This is accomplished by temperature profiling which means making a profile chart of the temperature across the furnace by the withdrawal of a thermocouple which has previously been inserted into the furnace. The withdrawal is at a predetermined rate from one end of the diffusion box of the furnace to the other. During withdrawal of the thermocouple, the temperature is recorded and the profile created is indicative of the stability and the flatness of the temperature range along the diffusion chamber. As improvements in the art of manufacturing microcircuitry occur, closer manufacturing control is required in order to produce devices whose operating characteristics are within design parameters.

It is common practice to profile a diffusion furnace at least once a week and more frequently if closer control is desired. Since the average diffusion box is approximately 40 inches deep and typically a thermocouple is withdrawn from the box at the rate of 1 inch per minute, it will take more than 40 minutes, usually up to an hour, to create a profile. Large manufacturers of microcircuitry with a large number of diffusion furnaces in production are faced with a continual profiling requirement. The integrity, accuracy and reliability of the profiles obtained are of paramount importance in order to insure adequate yield.

In the prior art, temperature profiling is costly and time consuming, especially if the results obtained are unsatisfactory or subject to doubt. Typically, in the prior art, a profile is obtained utilizing a combination of purchased equipment and homemade connections. The purchased equipment usually includes a thermocouple assembly with a thermocouple installed in a two-hole insulator and encased with a quartz tube. A thermocouple plug is attached to the tube and thermocouple wire. The thermocouple wire is usually platinum-rhodium and the thermocouple plug is an accepted equivalent material which, nonetheless, is not identical to the thermocouple. The thermocouple assembly is connected to an accurate strip recorder which has means for providing thermocouple compensation artificially, such as a bucking voltage device which eliminates the effect of ambient temperature, typically designed for an ambient of around 72° F. However, when the ambient temperature varies, the accuracy of the substitute bucking voltage and artificial compensation must vary accordingly, thereby inducing error. Additionally, an outside setting voltage supply must be available to verify the recorder accuracy periodically. The recorder and setting voltage supply package is generally mounted on a frame attached to a track.

The total error potential involved with this prior art arrangement includes; error potential at the thermocouple jack, error potential involved by artificial temperature compensation, and error potential involved because of varying characteristics of the thermocouple lead wires. This lead wire is supposed to produce substantially identical EMF characteristics with a particular type of thermocouple material and is commercially available at significantly lower prices per foot than is platinum-rhodium thermocouple wire. It is difficult to predict precisely the total error involved in each of the above-described potential error locations, however, these errors are cumulative and manufacturers of microcircuitry attempt to control the temperature of the diffusion chambers to within a tolerance of 1° C. or closer and any potential source of error at any location is important.

Furthermore, the problem of purchasing separate equipment from separate sources and attempting to bring the equipment together with homemade additions is subject to many problems.

SUMMARY OF THE INVENTION

This invention provides a temperature profile recording apparatus in a single package with continuous thermocouple wires and no thermocouple jacks so that the thermocouple wires extend directly to a refrigerated water temperature reference system. This itself eliminates three known error potentials; in the thermocouple jack, the connection to the jack and the elimination of thermocouple equivalent leads. A highly accurate strip recorder is used having a self-contained, highly accurate reference-setting voltage supply in the recorder and a refrigerated water temperature compensation system within the recorder. The recorder has a permanently attached support rail mounting a drivescrew for driving a carriage via a nut to move the thermocouple into and out of the diffusion furnace. A reversing motor drives the screw to allow reversing the direction of profiling. Spaced buttons operate an electric switch on the carriage to cause a supplemental pen in the recorder to create a mark on the margin of the recorder paper, thereby allowing ready location of any dimension where a deviation from a flat temperature within the diffusion chamber is indicated. An automatic cutoff for the lead screw is provided so that after profiling starts, a technician can leave the equipment, confident that it will automatically stop profiling when the thermocouple has been withdrawn.

BRIEF DESCRIPTION OF THE DRAWINGS

FIG. 1 is a side elevational view of the temperature profile recording apparatus of this invention;

FIG. 4 is a detailed side elevational view, with portions shown in section for the sake of clarity, illustrating the drive arrangement;

FIG. 5 is a sectional view taken along line 5—5 of FIG. 4;

FIG. 7 is an end elevational view of an embodiment utilized for profiling more than one diffusion chamber with a single recorder;

FIG. 8 is a schematic view incorporating a wiring diagram; and

DESCRIPTION OF THE PREFERRED EMBODIMENTS

Figure 3:
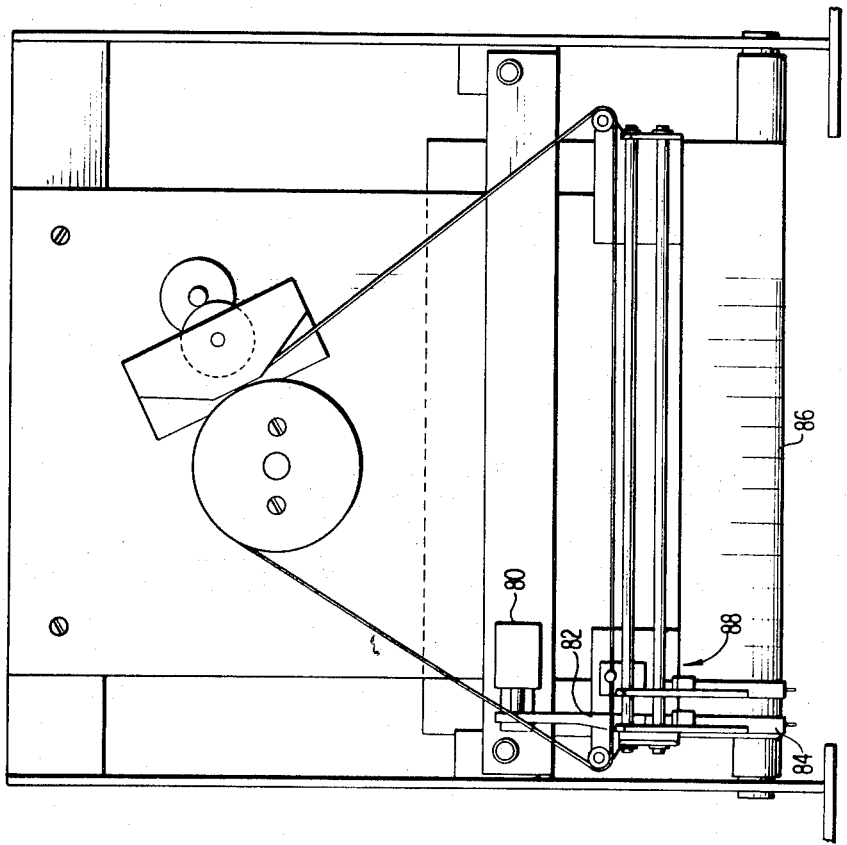
FIG. 3 is a top plan view of a portion of the recorder shown along line 3—3 of FIG. 1.

A temperature profile recording apparatus 10 is a single assembly and includes a highly accurate strip chart recorder assembly 12 which may, for example, be of the type sold by Conklin Instrument Corporation, Pleasant Valley, N.Y. Model 215 B and generally described in Conklin U.S. Pat. No. 3,161,459, granted Dec. 15, 1964. The recorder contains a highly accurate setting voltage supply set by dials 15 and controlled by switch 17.

Within the recorder assembly is a refrigerated temperature reference system 14 providing 32° F. of reference temperature by utilizing a hermetically sealed refrigerated vial of water which is turned to slush and whose 32° F. temperature is accurately maintained within a tolerance of ±0.01° C. and is manufactured by the Joseph Kaye Company, Boston, Mass. under U.S. Pat. No. 3,091,940, granted June 4, 1963.

A thermocouple junction 16, for example, of platinum-rhodium may be utilized to measure the temperature along a profile of a heated enclosure 18, e.g., a diffusion furnace of the type utilized in the manufacture of microcircuitry. The thermocouples junction 16 is a junction at one end of thermocouple wires 20 of platinum-rhodium type and these wires extend completely from the junction 16 to the temperature reference system 14 as can be seen in FIG. 8 for eliminating any potential source of error with thermocouple equivalency wire, thermocouple plugs and connections thereof.

The thermocouple junction 16 is at one end of a protective tubular member 22 which may be, for example, a quartz tube surrounding an alumina insulator having a pair of holes for the thermocouple wire. The tubular member 22 is adapted to be inserted into and subsequently withdrawn from the diffusion furnace 18 by means of a reversible drive motor 24 and a mechanical drive connection 26 of the screw and nut type. The drive connection includes a lead screw 28 rotatably journaled by end plates 30 and 32 in a channel rail 34 and the screw is rotated by motor 24. A carriage assembly 36 supports the tubular protective member 22 which is connected thereto by suitable clamps 38.

A bumper 31 is provided at the end of the channel for butting against the side of the diffusion furnace 18 and locating the apparatus.

The carriage assembly 36 includes a chassis 40 having flanged rollers 42, 44 and 46 cooperating with the flanges of channel member 34 as shown in FIGS. 4 and 5. A lead screw support 48, connected by suitable members 50 to the chassis 40, supports the lead screw from the chassis. A lead screw engaging half nut 52 on arm 54 is also connected to the chassis by pivot shaft 56. Thus, rotation of screw 28 causes the screw threads cooperating with nut 52 to drive the carriage assembly 36 and hence the protective tubular member 22 and thermocouple junction 16. A guide member 58 serves as a guide for arm 54 and a spring 60 biases the arm so the nut 52 is in engagement with the lead screw 28. A handle 62 is provided on one arm of 54 and extends out from under the carriage for actuation to manually disengage the nut 52 and move the nut assembly 36 by hand. The other end of arm 54 mounts a switch 64, for example, a microswitch having an actuating arm 66. A plurality of spaced buttons 68 project upwardly from the inner surface of the channel 34 as shown and when these buttons are encountered by switch actuator 66, the switch 64 is thrown causing a mark on the strip chart of the recorder thus indicating the particular position of the junction within the furnace. It is noted that at one end of the channel there are a number of buttons 68' closely spaced to indicate the beginning or end of a profile.

The lead screw 28 has a reduced diameter portion 55 with the tread removed. When the carriage traverses to the left as shown in FIGS. 1 and 4, and when the nut 52 arrives at the unthreaded portion 55, movement of the carriage will automatically stop. Thus, an operator can leave the profiler unattended and it will stop by itself after taking a profile.

Figure 2:
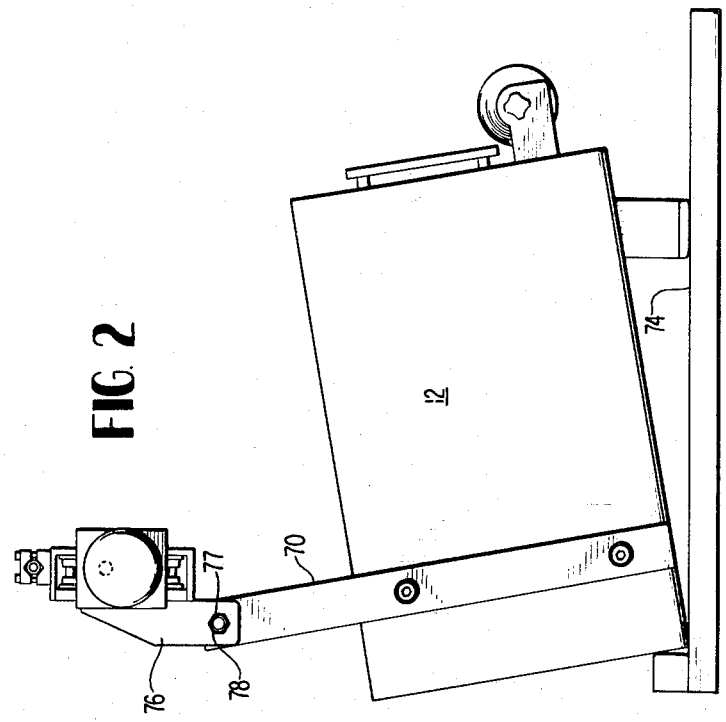
FIG. 2 is an end elevational view of the apparatus as shown in FIG. 1.
Figure 6:
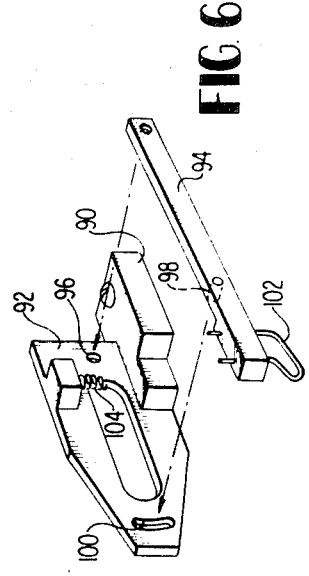
FIG. 6 is a perspective view of a floating marking pen.

The recorder assembly 12 mounts a pair of side members 70 and 72. The recorder may be attached and rest on a suitable base 74. The upwardly extending members 70 and 72 are connected by suitable nut and bolt means 77 to upper brackets 76 and 78 which in turn are attached to the channel 34, see FIG. 2. Thus, the upper channels can be separated from the recorder for shipment.

FIG. 7 shows a further embodiment in which the side member 70' extend an additional amount upwardly and mounts a pair of channels of drive assemblies 26' and 26'' via bracket 76' and 76'' for profiling two furnaces. The two drive assemblies are movable about a horizontal axis defined by the axis of bolts 77' and 77'' for adjustment to allow the protective tubular member 22 to align with a tube hole in the diffusion furnace 18. Although two units are shown in FIG. 7, additional units can be mounted on a side arm by bolting the units to spaced tapped holes 79 and 79'. In this manner, a number of diffusion tubes can be profiled simultaneously, using a single multichannel recorder.

Figure 9:
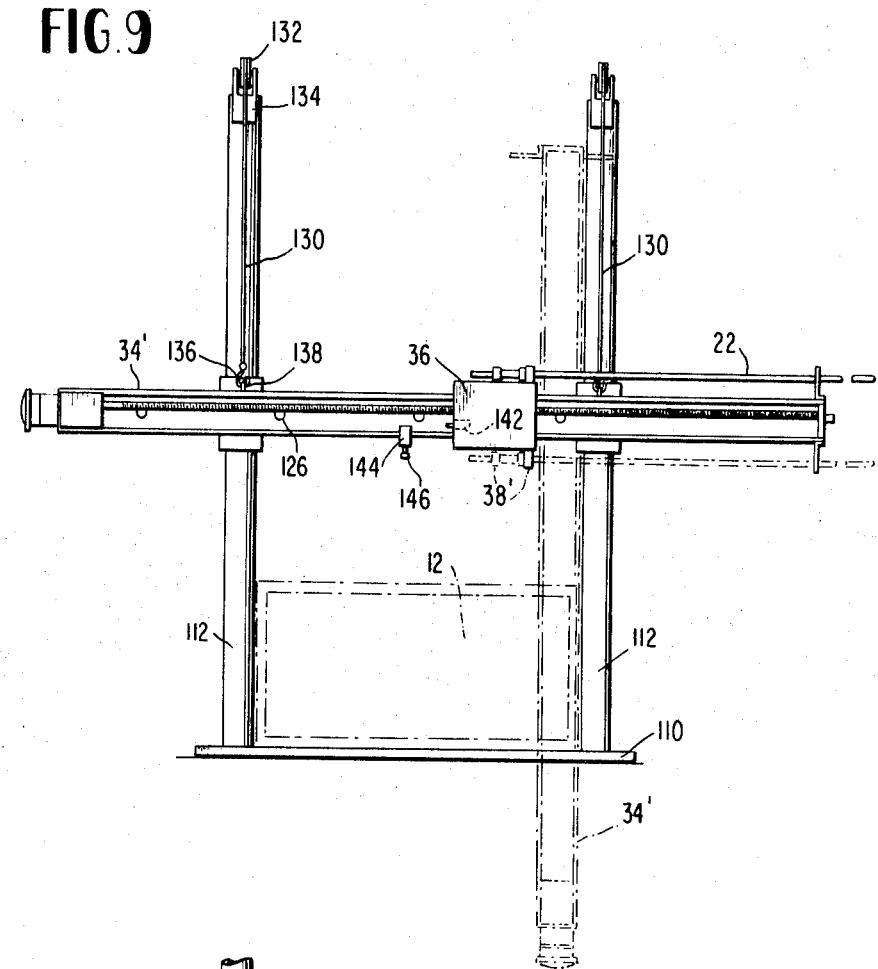
FIG. 9 is a front view of an additional embodiment showing the vertically slidable boom assembly of this invention.

FIG. 9 shows still a further embodiment which enables the tubular member 22 to be adjusted to various positions in order to align it with the corresponding tube hole on a great variety of different diffusion furnaces. The recorder 12 is positioned on a base member 110 having two spaced-apart upstanding tubular members 112 by means of a bracket 114 having leg members 116 which are secured to sleeves 118 positioned over the upstanding tubular members 112. The channel member 34' is secured to the bracket member 114 by means of bolts 120. Threaded members 122 are located both on the bracket 114 and on the channel member 31' to both enable the channel member 34' to be pivoted to a position shown by the phantom lines in FIG. 9 to facilitate transfer and storage of the entire temperature profile recording apparatus. Additional boltholes 124 and threaded members 126 are provided on the channel member 34' to enable the user to offset the entire assembly with respect to the upstanding tubular members 12. This offset position is often necessary where the diffusion furnaces are provided with ventilation hoods which extend outwardly from the end of the diffusion furnace.

Figure 10:
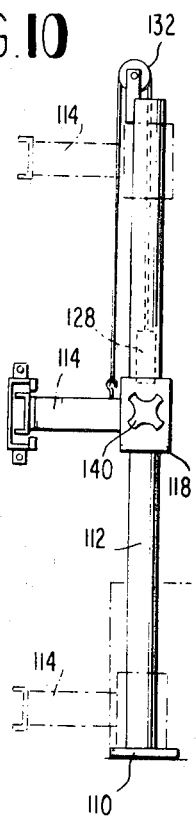
FIG. 10 is an end elevational view of the additional embodiment shown in FIG. 9.
Figure 11:
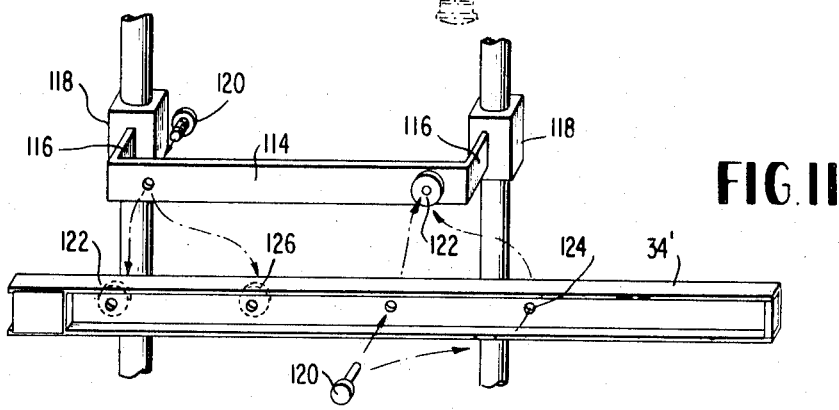
FIG. 11 is a perspective view showing the adjustable mounting of the thermocouple boom assembly.
Figure 12:
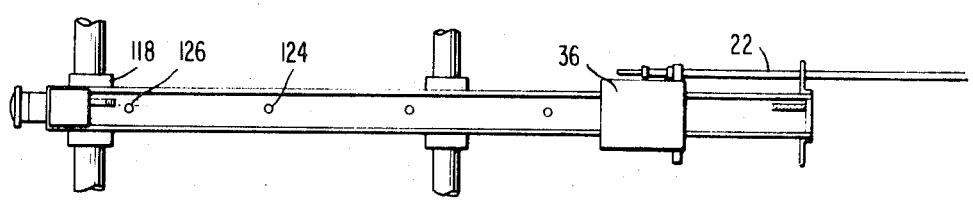
FIG. 12 is a front view of the thermocouple boom assembly in a second position.

In order to counterbalance the weight of the thermocouple boom so that it will remain in this selected position, a counterbalance weight 128 is suspended in each of the upstanding tubular members 112 by means of a cable 130. The cable extends over a pulley 132 which is rotatably mounted on the top of the standing tubular members 112 by means of a bracket 134. The cable 130 has a hook member 136 secured to the end thereof which hook engages an eyelet 138 secured to the channel member 134. The sleeves 118 have knobs 140 shown in FIG. 10 which have threaded portion (not shown) which engages the upstanding tubular members 112 when the knob 140 is turned to thereby positively lock the thermocouple boom to the upstanding tubular members 112.

The carriage assembly 36 is provided with additional clamps 38' secured to the underside of the carriage 36 for holding the tubular member 22 in this position. Movement of the tube 22 to the underside of the carriage 36 is often necessary due to the location of the lowest diffusion tube in diffusion furnaces using ventilation hoods. Supplemental microswitch 142 is also provided on the movable carriage 36 for automatically shutting of the worm drive for retraction of the probe and also to shut off the chart drive within the recorder when the microswitch 142 engages the stopblock 144 slidably mounted on the channel 34' by means of an inverted thumbscrew 146. The carriage 36 also contains switch 64 previously described associated with the margin-marking components of the apparatus.

FIG. 3 shows the top view of a recorder assembly which includes an arrangement for marking a margin of a strip chart by supplemental pen, and a unique floating pen arrangement for added accuracy. The margin-marking components include a relay 80 electrically connected to switch 64 so that when switch 64 passes over a button 68 relay 80 is actuated causing movement in linkage 82 moving supplemental margin pen 84 and marking the margin of graph paper 86 to indicate the position within furnace 18 of the thermocouple 16.

A floating marking pen assembly 88 includes a connecting block 90 secured to a marking pen drive line and carrying an upright plate 92. An arm 94 is pivotally connected to plate 92 at pivot point 96 and has a stud 98 near its forward end cooperating with an arcuate slot 100 to allow limited pivotal movement of the arm 94. A marking pen 102 of conventional type is carried on the front end of the arm and a spring 104 biases the arm downwardly onto the marking surface. This construction allows the pen to automatically adjust itself to the horizontal axis of the writing platen to accommodate platens in different positions due to manufacturing tolerances. It provides a cushion effect of the element against the platen when the carriage is lowered and locked into position.

The operation will now be described.

Apparatus 10 is positioned adjacent the diffusion furnace 18 such that the protective tube 22 can enter a diffusion tube for profiling. The lever 62 may be pushed down to disengage nut 52 and the carriage assembly 36 may be moved to the right to position the thermocouple junction 16 deeply in the furnace. The motor may then be operated in a direction to rotate the screw and move the carriage assembly 36 to the left. The temperature sensed by the thermocouple junction 16 will be fed to the recorder and marked thereon by pen 102 with the reference junction 14 maintaining correct temperature in the thermocouple wires 20 minimizing any error. As the carriage moves to the left, the button 68 cause the marking pen 84 to indicate the position within the unit.

However, prior to the operation as set forth above, or after the operation, the unit is checked by applying a preset reference voltage indicating a particular temperature as set on the face of the apparatus. Furthermore, the graph is set for a certain bandwidth of temperature say, for example, 1,090° to 1,110° C.

While the invention has been particularly shown and described with reference to a preferred embodiment thereof, it will be understood by those skilled in the art that various changes in form and details may be made therein without departing from the spirit and scope of the invention.

What is claimed is:

1. An apparatus for recording a temperature profile along a dimension within a heated enclosure such as a diffusion furnace, the apparatus comprising: a recorder assembly including a source of reference voltage; a temperature reference apparatus within the recorder assembly providing a stable reference temperature; a thermocouple junction; thermocouple wires of the same material as the thermocouple junction extending from the thermocouple junction to the temperature reference apparatus; a protective tubular member supporting the thermocouple wires from the thermocouple junction for a length at least as long as the dimension within the heated enclosure to be profiled; and means for moving the tubular member and thermocouple junction within the heated enclosure including a drive motor, a movable carriage assembly means for supporting the protective tubular member and including an electrical switch; a channel rail for guiding said carriage assembly and having spaced switch actuators; and means for operatively connecting the drive motor and carriage assembly means and automatically stopping the carriage assembly means after profiling the temperature, whereby the electrical switch of the carriage assembly means is positioned to be actuated by the spaced switch actuators on the channel rail.

2. An apparatus as defined in claim 1 wherein the drive motor is a reversible motor and the means for operatively connecting the drive motor and carriage assembly means includes a lead screw having a nonthreaded relieved portion for automatically stopping the carriage assembly means.

3. An apparatus as defined in claim 2 wherein the channel rail supports the lead screw and motor.

4. An apparatus as defined in claim 3 wherein the channel rail is supported by brackets extending upwardly from the recorder assembly.

5. An apparatus as defined in claim 4 wherein the carriage assembly includes a split nut biased into engagement with the screw and mounted on a movable arm so as to be disengageable to allow the carriage to be moved along the channel rail manually.

6. An apparatus as defined in claim 2 wherein there are at least two separate drive motors and lead screw drive connections spaced apart on supporting brackets.

7. An apparatus as defined in claim 3 wherein the channel rail is slidably mounted on upstanding tubular member.

8. An apparatus as defined in claim 7 wherein the channel rail has means for securing said channel rail to said upstanding tubular members in a plurality of horizontal and vertical positions.

9. An apparatus as defined in claim 1 wherein the recorder assembly includes a marking pen and means floatingly mounting the pen on a pen carrier.

10. An apparatus as defined in claim 9 wherein the means floatingly mounting the pen comprises a pen arm with a pen on one end and a pivot connection adjacent the other end, means guiding the pen for limited pivotal movement adjacent pen end, and spring means biasing the pen toward a marking surface.

* * * * *